Nov. 17, 1931.  W. HILDEBRAND  1,832,392

SINGLE CHAMBER COMPRESSED AIR BRAKE

Filed Dec. 3, 1928

Patented Nov. 17, 1931

1,832,392

UNITED STATES PATENT OFFICE

WILHELM HILDEBRAND, OF BERLIN, GERMANY

SINGLE CHAMBER COMPRESSED AIR BRAKE

Application filed December 3, 1928, Serial No. 323,396, and in Germany April 16, 1928.

This invention relates to single chamber compressed air brakes of the kind in which, for the purpose of obtaining a gradual action even when releasing the brake, two conjointly working control valves are provided, one of which control valves, which may conveniently be designated the first control valve, is exposed to the pressures in the train pipe and the auxiliary reservoir only, while the other, hereinafter called the second control valve, is exposed to the pressure in the brake cylinder, to a variable pressure (which may be the train pipe pressure, or the pressure in a chamber or container varying in accordance with the train pipe pressure) and to an approximately constant pressure (for example the pressure in a control chamber closed against the spaces having variable pressures by means of a non-return valve or the like). Known brakes of this kind, in which the brake cylinder is filled from the auxiliary air reservoir, are not suitable for all working conditions, because the different couplings and buffers in the case of long goods trains produce variable conditions for brake working.

The expression "single chamber compressed air brake" denotes a brake in which compressed air is supplied only to the chamber or air space in front of the piston in the brake cylinder to move the piston to apply the brake, the piston being returned into the brake release position by a spring when the air pressure in this chamber is reduced, as distinguished from "double chamber" brakes wherein compressed air acts on both the front and back of the piston, the movements of the piston being controlled by varying the pressure in the respective chambers which are separated by the piston.

According to the invention the transfer chamber, which at the beginning of the braking operation receives from the train pipe a quantity of air corresponding with that displaced by the advance of the control piston, is connected through the first control valve with the train pipe when applying the brake, and is connected with the atmosphere when releasing the brake. In the construction of such a brake for goods train service, the valve effecting the initial quick increase of pressure in the brake cylinder, known as the minimum pressure valve, is located in the duct or passage between the first control valve and the brake cylinder. The throttled or constricted part of the pipe that determines the rise of pressure in the brake cylinder is located between the brake cylinder and the junction of the two ducts through which compressed air flows to the brake cylinder during the braking operation.

In order that the said invention may be clearly understood and readily carried into effect, the same will now be described more fully with reference to the accompanying drawings or diagrams wherein:—

Figure 1:
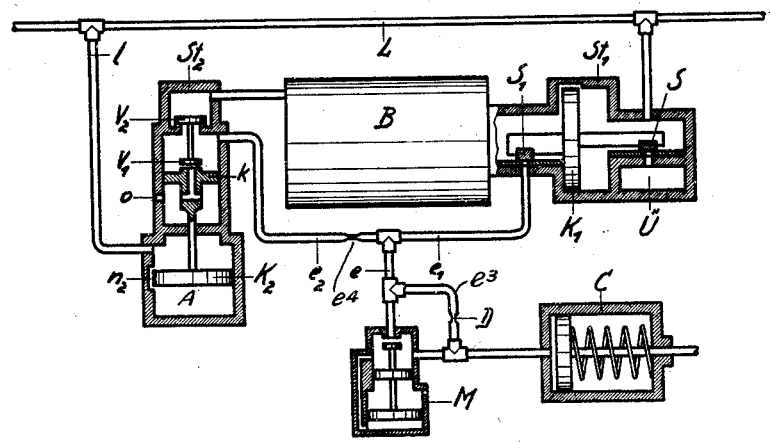
Figure 1 represents one arrangement of valves embodying the invention, in the inoperative or release position.

A indicates a chamber under approximately constant pressure, B the auxiliary air reservoir, C the brake cylinder. In Figure 1 the first and second control valves $St'$ and $St^2$ are connected in parallel with the train pipe L. The first control valve $St'$ comprises a slide valve S actuated by a piston $K'$ normally closing the inlet of the transfer chamber U, which chamber when braking absorbs a volume of air equivalent to that displaced by the advance of the piston $K'$. The manner in which the release of air pressure from the chamber U is effected, when the brake is taken off, is immaterial to this invention, and the devices and connections necessary for such release are therefore not illustrated. The brake cylinder C is connected with a pipe $e$ by way of a minimum pressure valve M and also by way of a bye-pass pipe $e^3$ in which is a throttled or constricted part D. The pipe $e$ has branches $e'$ and $e^2$, the branch $e'$ being normally closed by the slide valve $s'$ governed by the piston $K'$ and the branch $e^2$ opening into the casing of the second control valve $St^2$. The branch $e^2$ is shown with a constricted part $e^4$. The second control valve $St^2$ is connected by the branch pipe $l$ with the train pipe L, and both control valves $St'$ and $St^2$ are connected with the auxiliary air reservoir B. The chamber A is filled with air under pressure from the train pipe through a filling groove $n^2$ adjacent to the piston $K^2$, when the brake is off, and the piston $K^2$ is therefore subjected on one side to approximately constant pressure in the chamber A and on the other side to variable pressure in the train pipe. When the valve V' is closed, the piston K connected with the said piston $K^2$ is on one side open to the atmosphere through the opening O, and on the other side exposed to brake cylinder pressure through the branch pipe $e^2$. When the valve V' is open and the valve $V^2$ closed, the release of air from the brake cylinder takes place through the branch $e^2$ and opening O. When braking, compressed air is admitted to the brake cylinder from the auxiliary reservoir B through both the branches $e'$ and $e^2$.

Figure 2:
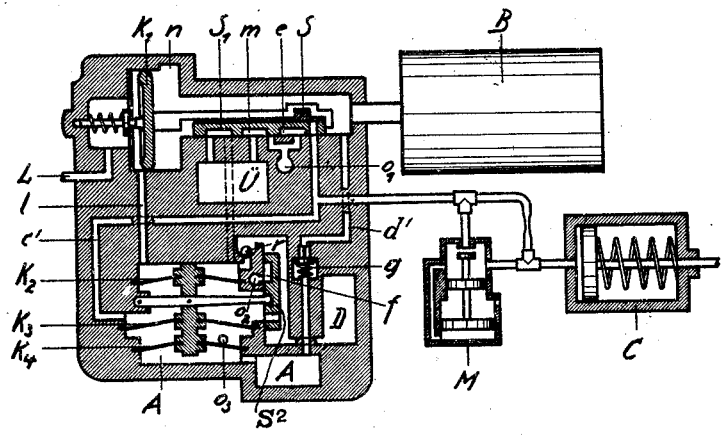
Figure 2 represents a modified arrangement of valves in the braking position.

In the embodiment illustrated in Figure 2 the piston K' which is exposed to the pressure in the train pipe and auxiliary reservoir controls a graduating slide valve S and the main slide valve S'. The second control valve comprises the diaphragms $K^2$, $K^3$ and $K^4$. The upper diaphragm $K^2$ is of less size than the middle one $K^3$ and of the same size as the lower one $K^4$. The diaphragm $K^2$ is exposed to the pressure in the train pipe through the duct $l$ and to the pressure of the brake cylinder through the duct $c'$. When the brake is released air is exhausted from the space between the diaphragms $K^2$ and $K^3$ conjointly with the brake cylinder C, on the one hand through the channel $c'$, the exhaust port $e$ in the slide valve S', and the exhaust opening $o'$, and on the other hand through the port $f$ in the slide valve $S^2$ and the opening $o^2$ leading to the atmosphere. The space between the diaphragms $K^3$ and $K^4$ is constantly relieved of pressure by means of the opening $o^3$, and the space below the diaphragm $K^4$ is under the approximately constant pressure of the control chamber A. When the brake is being released the auxiliary air reservoir B is filled through the groove $n$. Train pipe air enters through the duct $l$ into the space above the diaphragm $K^2$, and the chamber D is filled through a ball check valve $r$. The chamber A is filled through a duct $d'$ and a non-return valve $g$. The transfer chamber U is opened to the exhaust aperture $o'$ leading to the atmosphere through a recess $m$ in the slide valve S'.

What I claim and desire to secure by Letters Patent of the United States is:—

1. In combination with a train pipe, a brake system including a brake cylinder, an auxiliary reservoir, a constant pressure chamber, a transfer chamber, a distributing valve, means communicating the train pipe with said distributing valve, said distributing valve being operable by variations of pressure in the train pipe and in the auxiliary reservoir respectively and being exposed to the pressure in the brake cylinder and in the constant pressure chamber, a second distributing valve exposed only to the pressure in the train pipe and to that in the auxiliary reservoir, said second distributing valve controlling the inlet and outlet of said transfer chamber to establish communication between the train pipe and said transfer chamber upon the application of the brake, means communicating the brake cylinder with both said distributing valves, and a minimum pressure valve located in said last mentioned means for effecting the initial increase of pressure in the brake cylinder.

2. In combination with a train pipe, a brake system including a brake cylinder, an auxiliary reservoir, a constant pressure chamber, a transfer chamber, a distributing valve, means communicating the train pipe with said distributing valve, said distributing valve being operable by variations of pressure in the train pipe and in the auxiliary reservoir respectively and being exposed to the pressure in the brake cylinder and in the constant pressure chamber, a second distributing valve exposed only to the pressure in the train pipe and to that in the auxiliary reservoir, said second distributing valve controlling the inlet and outlet of said transfer chamber to establish communication between the train pipe and said transfer chamber upon the application of the brake, a minimum pressure valve communicating with the brake cylinder, a pipe having branch arms communicating both distributing valves with the housing of the minimum pressure valve, said pipe having a by-pass portion provided with a constricted port through which the compressed air flows to the brake cylinder during the braking operation.

WILHELM HILDEBRAND.